US005481599A

United States Patent [19]

MacAllister et al.

[11] Patent Number: 5,481,599
[45] Date of Patent: Jan. 2, 1996

[54] AUTOMATED AUDIO OUTPUT DEVICE FOR A TELEPHONE SET

[76] Inventors: Donald I. MacAllister, 1300 Bristol St. North #100, Newport Beach, Calif. 92660; Douglas L. Turner, 1116 Lundy Dr., Simi Valley, Calif. 93065

[21] Appl. No.: 340,146

[22] Filed: Nov. 15, 1994

Related U.S. Application Data

[63] Continuation-in-part of Ser. No. 95,907, Jul. 22, 1993, abandoned.

[51] Int. Cl.⁶ .............................. H04M 1/57; H04M 3/06
[52] U.S. Cl. ........................... 379/101; 379/374; 379/373
[58] Field of Search .................................. 379/373, 374, 379/101, 87

[56] References Cited

U.S. PATENT DOCUMENTS

| H118 | 9/1986 | Biggs et al. | 379/374 |
|---|---|---|---|
| 4,124,773 | 11/1978 | Elkins | 379/101 |
| 4,491,694 | 1/1985 | Harmeyer | 179/100 L |
| 4,653,087 | 3/1987 | Galich | 379/110 |
| 4,841,572 | 6/1989 | Klayman | 381/17 |
| 4,856,055 | 8/1989 | Schwartz | 379/374 |
| 4,920,556 | 4/1990 | Wong | 379/101 |
| 4,961,215 | 10/1990 | Fernandez et al. | 379/101 |
| 5,099,513 | 3/1992 | Kim et al. | 379/374 |
| 5,187,734 | 2/1993 | Takahashi et al. | 379/67 |
| 5,388,150 | 2/1995 | Schneyer et al. | 379/374 |

FOREIGN PATENT DOCUMENTS

| 203394 | 12/1986 | European Pat. Off. | 379/374 |
|---|---|---|---|
| 2041059 | 2/1990 | Japan | 379/374 |
| 2114748 | 4/1990 | Japan | 379/374 |
| 2153665 | 6/1990 | Japan | 379/374 |
| 6078044 | 3/1994 | Japan | 379/374 |
| 2210755 | 6/1989 | United Kingdom | 379/374 |

Primary Examiner—Jeffery A. Hofsass
Assistant Examiner—Daniel S. Hunter
Attorney, Agent, or Firm—Gene Scott

[57] ABSTRACT

A circuit for use with or built into a telephone set, that detects and intercepts the telephone company's ring signal, supressing the telephone set's existing ringer, and substituting instead, a user selected audio segment. A choice of audio segments may be made from an internal memory device or as downloaded from a supplier of such audio segments by high-speed modem. A synthesized stereo signal is generated so that an incoming phone call is announced by a high quality, stereo audio signal of ones choice such as the sound of wind, water or trees, animal sounds, music, or other sounds. Usable audio segments may be obtained via a built-in microphone or downloaded at high speed through the use of a built-in modem over phone lines.

4 Claims, 2 Drawing Sheets

AUTOMATED AUDIO OUTPUT DEVICE FOR A TELEPHONE SET

RELATED REFERENCES

This application is a Continuation-in-part of U.S. Ser. No. 08/095,907 filed Jul. 22, 1993, entitled: "Automated Telephone Secretary using Voice Commands", now abandoned.

FIELD OF THE INVENTION

This invention relates generally to telephone sets and more particularly to a device that substitutes a user selected digital recording for the standard incoming telephone call ring alert sound for announcing the presence of an incoming phone call. Further, the invention relates to improvements in the audio quality of the call announcement.

BACKGROUND OF THE INVENTION

The audible ringing pattern of an incoming call is strictly fixed by and dependent upon the pattern of direct or indirect ringing signals placed upon the subscriber's line by the telephone switching office. Unfortunately, the standard ring of most telephones can be unpleasant, and, in environments in which the telephone rings frequently, such ringing often becomes irritating. This is due in part to the poor quality of the audio output devices which are in use today.

The invention and use of stereo synthesizers is known to the public. For example, U.S. Pat. No. 4,841,572 issued to Klayman in 1989 discloses a stereo image enhancement system in which difference signal components in relatively quieter difference signal frequency bands are boosted to provide an improved stereo image. Such a system could greatly enhance and improve the quality of audio announcements of incoming telephone calls.

However, another problem with standard ringing is that the tone of most telephones is rather shrill, and would thus be annoying even with improved ring quality. In addition, the audible ringing signal is virtually identical for each telephone, which makes it extremely difficult to determine which telephone is ringing in settings, such as offices or households, with more than one phone line.

Thus, there is a need for a device that allows each user to select an output to replace the standard ring tone of a telephone. Such a device would also include a stereo enhancement system, to improve the quality of the selected output. The present invention fulfills these needs and provides further related advantages.

SUMMARY OF THE INVENTION

The present invention provides a circuit that overcomes the above mentioned deficiencies of present telephone sets and allows the user a choice of custom audio segments in place of a conventional telephone ringer output.

More specifically, the circuit of the present invention allows the user to choose a sound file for use as audio announcement. This novel invention allows the user to select a digitally recorded audio signal, such as a voice message, segment of music or sound effect, from a number of individual recordings held on a memory device; either internal or external to the present invention. The user selected message is preferably output in high fidelity stereo sound through internal or external speakers when a ring signal is detected by the circuit, instead of activating a conventional ringing device within the telephone set.

Thus, it is an object of the present invention to provide an improved incoming phone call announcement. Another object of the invention is to provide a circuit that allows the suppression of the built-in phone ringer in deference to a selected audio segment. A further object of the instant invention is to provide a means to download a choice of such audio sound segments from a supplier of such sounds directly into the telephone set using the telephone instrument itself. Another object of the invention is to enable the above objects to be achieved either as a stand-alone circuit which is cable compatible with any standard telephone set, or as a circuit which is integrated into a telephone instrument.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawing illustrates the invention. In such drawing.

DETAILED DESCRIPTION OF THE PREFERRED EMBODIMENT

Figure 1:
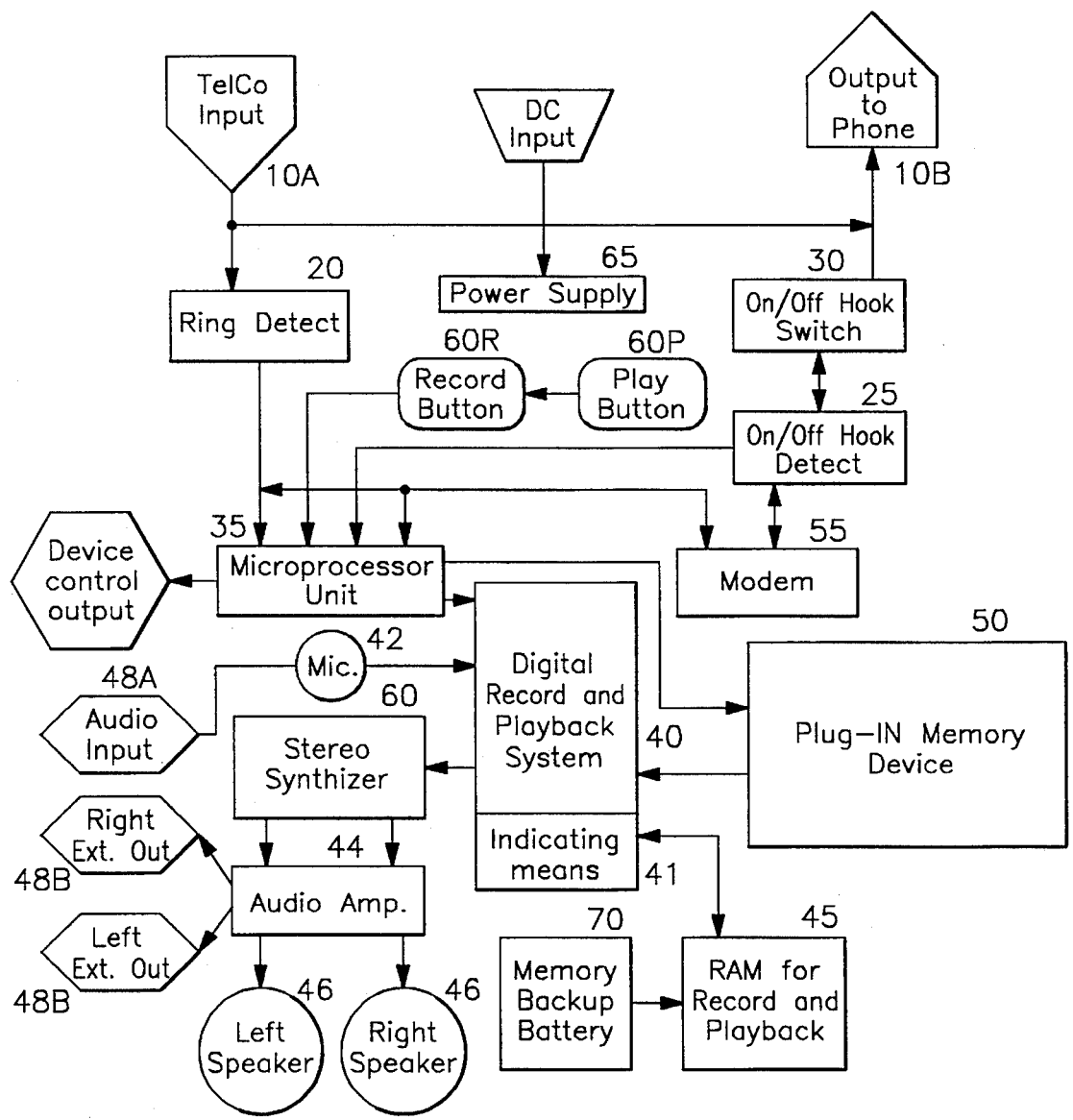
FIG. 1 is a logic block diagram of the preferred embodiment of the present invention, showing the elements of the device and their interrelationship.
Figure 2:
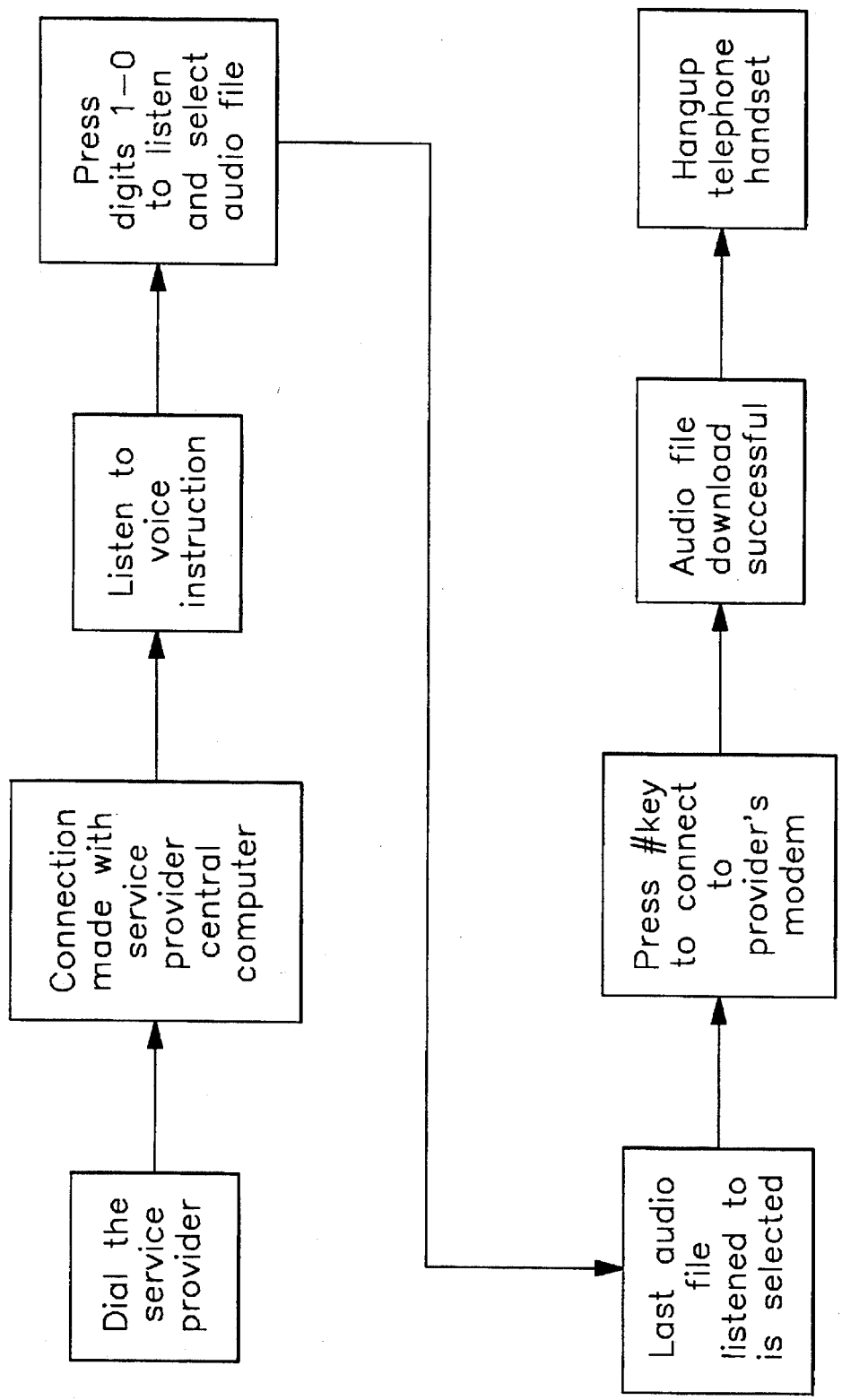
FIG. 2 is a flow chart of the preferred process of downloading audio segments from a remote source to a memory device of the invention.

FIG. 1 is a block diagram of the preferred embodiment of the present invention. The present invention is an electrical circuit which, when used in conjunction with a telephone set, enables the substitution of a user selected, audio output in place of the standard ringing tone of the standard telephone set. The circuit may be discrete, or may be integrated into the circuit of the telephone set. For purposes of clarity, the circuit of the present invention will be described as a discrete device.

An input jack 10A accepts a phone line from the telephone company, and an output jack 10B is used to connect the circuit to a standard telephone set. The circuit preferably includes a ring detector 20, an on/off hook detector 25, an on/off hook switch 30, user interface control switches 60P and 60R, preferably in the form of PLAY and RECORD buttons respectively, and a power supply 65. Power supply 65 preferably includes a back-up battery in case of power failure. A further element of the circuit which may be included is an output interface jack 75 (not shown) for alerting any external electronic device or appliance when a ring signal is detected.

The circuit also includes a digital record and playback system 40, controlled by a microprocessor unit 35. The record and playback system 40 preferably has a microphone input 42, audio amplifier 44 with volume control, a pair of speakers 46, audio input and output jacks 48A and 48B, an internal memory device 45 (such as a solid state random access memory for storing a real-time recording for playback), a memory backup battery 70, and an external plug-in memory device 50 (optional). Such a plug-in memory device 50 may be a any device capable of storing audio sound files, such as a read-only-memory device, PCMCIA standard compatible plug-in memory card, or a FLASH card for accepting recordings over a modem 55 which may be included as part of the circuit or may be external to the circuit of the present invention.

The circuit also preferably includes a sub-circuit for generating stereo image enhanced output signals 60 from a monaural input signal. This sub-circuit 60 is preferably as described in U.S. Pat. No. 4,841,572 to Klayman on Jun. 20, 1989, which is hereby incorporated into the instant application by reference. The unique stereo enhancement taught by Klayman boosts components in relatively quieter difference signal frequency bands to provide an improved stereo image. A simulated sum and difference signals are produced from a monaural input by using a phase shifter and splitter to provide zero and ninety degree outputs having a constant ninety degree phase separation between them at all audio frequencies. The leading signal is employed as a simulated sum signal, while the other is used as a simulated difference signal. The simulated difference signal has different frequency components, each delayed by a different amount relative to corresponding components of like frequencies of the simulated sum signal. After suitable filtering, the sum and difference signals represent an improved pair of synthetically derived stereo signals useful as inputs to an image enhancement circuit.

The circuit of the present invention preferrably operates automatically so that when the ring detector 20 senses the presence of a ring signal on the telephone company's line, it produces a signal, such as a high logic level signal, to the microprocessor 35 which inturn signals the controlled digital record/playback system 40 such that a pre-selected recording is played. The selected recording is played back continuously until the ring signal is no longer detected or the on/off-hook detector 25 senses that the telephone hand set has been picked up as indicated by on/off-hook switch 30. The built in microphone 42 is preferably used to record a new audio segment from a source of live sounds, and a monaural or stereo signal may be fed into the audio input jack 48A from an external source such as a radio, stereo system, home theater system, or any source of audio band signals as a further method of recording a new audio segment. Preferably, the maximum recording time is 15 seconds long, but depending on the amount of memory 45 that is made available, it may be longer or shorter. A visual indicating means 41 such as a light emitting diode (LED), indicates recording of the audio segment, and when six seconds of record time is left the indicator signals to notify the user of recording time remaining (such as by blinking). The preferred embodiment includes memory space for nine audio segments.

The external plug-in memory device 50 is preferably a read-only-memory providing four megabits of storage capacity for eight digitized, 15 seconds long, audio segments, but it could also be any of a wide variety of memory devices known to those of average skill in the art. The record times assume the use of a four bit compression/decompression algorithm sampling at 8,000 hz, resulting in a 32,000 bits per second play-out rate. Assume that this rate is constant, the number and length of audio segments stored is only dependent upon the size of the memory.

A modem 55 receives and downloads audio segments (sound files) from a service bureau or other source, over standard telephone lines, to the plug-in memory device 50. To accomplish this, the user dials the service bureau's number and, when connected, is instructed to select one of a plurality of stored audio segments available for downloading. The user listens to the different audio segments offered and downloads the desired segments by using his telephone keypad. Once the audio segments of choice are selected, the user then commands transfer of these segments over modem 55.

PERTINENT USER INSTRUCTIONS

The following instructions are provided as an exemplar and alternative embodiments of the present invention may operate in accordance with other procedures.

RECORDING/SELECTING AN AUDIO SEGMENT OUTPUT

1. To begin recording a segment, press and hold down the RECORD button 60R. Release the RECORD button 60R to stop recording.

2. To play the existing selected audio segment, press and release the PLAY button 60P.

3. To select a new audio segment, press and release the PLAY button 60P within two seconds after a playback or during a playback repeatedly to sequence through all nine possible audio segments.

4. The last played selection is the audio segment that will play in a continuous loop when the next ring signal is detected.

DOWNLOADING AUDIO SEGMENTS FROM A SERVICE BUREAU

1. Dial the service bureau's phone number using a telephone set keypad.

2. Once connected, use the telephone keypad digits 1-0 as play buttons. Press the telephone key 1 to listen to audio segment one, key 2 to listen to segment two, etc. Any of the ten possible audio segments may be listened-to in any order over the telephone handset by simply pressing the corresponding digit key.

3. Once the desired selection is made, press the telephone set's (#) key to receive and save the audio segment onto the plug-in memory card 50. For example, if audio segment five is the desired selection, press the 5 key and then the # key. Once the audio segment has been written to the memory 50 the user will be asked by the service's computer if another audio segment is desired. If yes, the user will proceed to select and receive by repeating the above procedure. If not, the user will hang up the handset to disconnect. The memory 50 can be written to until full. Once full the user must select an audio segment to be written over if a new segment is desired, or use another plug-in memory 50.

4. With a full memory card inserted into the circuit, it is possible to download a selected audio segment and write over an existing one. To write over an existing audio segment press the PLAY button 60P until the selection to be written over is played. Then press the corresponding digit on the telephone keypad of the desired audio segment to be downloaded and press the # key. The downloaded selection will replace the existing selected audio segment in the memory card 50.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A telephone call announcement system interconnected between an incoming telephone line and a telephone set comprising:

a ring detector connected to the incoming telephone line and producing an internal ring signal in response to incoming ringing signals;

an off-hook detector connected to the telephone set and producing an off-hook signal in response to a user taking the telephone set off-hook;

a controller connected to the ring detector and the off-hook detector and receiving the internal ring signal and off-hook signal respectively therefrom;

a record and playback system connected to the controller, an audio output means, and a storage means, for recording on the storage means one or more audio segments and playing through the audio output means at least one of the audio segments;

a modem connected to the controller and the telephone line, wherein the controller places a call to an external telephone system via the modem and downloads at least one audio segment from the external telephone system and wherein the downloaded audio segment is recorded by the record and playback system onto the storage means; and wherein the record and playback system plays at least one of the audio segments through the audio output means in response to the controller receiving the internal ring signal and playing continuously until one of (a) the internal ring signal is no longer received after a predetermined time or (b) the off-hook signal is received.

2. The system of claim 1 wherein the storage means is a removable memory device.

3. The system of claim 1 further including at least one of an input microphone or an audio input jack connected to the record and playback system for recording one or more audio segments onto the storage means.

4. The system of claim, 1 wherein the audio segments are stereophonic.

* * * * *